(12) United States Patent  (10) Patent No.: US 7,472,468 B2
Yeadon  (45) Date of Patent: Jan. 6, 2009

(54) METHOD FOR WINDING BRUSHLESS DC MOTORS

(75) Inventor: William H. Yeadon, Iron River, MI (US)

(73) Assignee: Yeadon Energy Systems, Inc., Iron River, MI (US)

( * ) Notice: Subject to any disclaimer, the term of this patent is extended or adjusted under 35 U.S.C. 154(b) by 0 days.

(21) Appl. No.: 11/695,955

(22) Filed: Apr. 3, 2007

(65) Prior Publication Data

US 2008/0244894 A1 Oct. 9, 2008

(51) Int. Cl.
 *H02K 15/00* (2006.01)
(52) U.S. Cl. .............................. 29/596; 29/598; 29/605; 29/606; 29/732; 310/156.41; 310/101
(58) Field of Classification Search ........... 29/596–598, 29/729–737, 605–609; 310/177, 156.08, 310/208, 254, 47, 156.41, 101; 264/250, 264/272.2, 272.11, 238; 425/116–125
See application file for complete search history.

(56) References Cited

U.S. PATENT DOCUMENTS

| | | | |
|---|---|---|---|
| 2,759,116 A | 8/1956 | Glass | |
| 3,441,761 A | 4/1969 | Painton et al. | |
| 3,650,021 A | 3/1972 | Karol | |
| 3,831,267 A | 8/1974 | Onishi et al. | |
| 3,935,909 A | 2/1976 | Mabuchi et al. | |
| 3,942,054 A | 3/1976 | Kristen et al. | |
| 4,130,769 A | 12/1978 | Karube | |
| 4,143,289 A | 3/1979 | Williams | |
| 4,317,072 A | 2/1982 | Goof et al. | |
| 4,336,475 A | 6/1982 | Morinaga et al. | |
| 4,369,383 A | 1/1983 | Langley | |
| 4,385,248 A | 5/1983 | Laskaris | |
| 4,393,344 A | 7/1983 | Whellams | |
| 4,445,061 A | 4/1984 | Jackson, Jr. | |
| 4,463,276 A | 7/1984 | Nakamura | |
| 4,484,097 A | 11/1984 | Kanayama et al. | |
| 4,547,713 A | 10/1985 | Langley et al. | |
| 4,551,645 A | 11/1985 | Takahashi et al. | |
| 4,556,811 A | 12/1985 | Hendricks | |
| 4,563,808 A | 1/1986 | Lender | |
| 4,573,631 A * | 3/1986 | Reeves | 229/404 |
| 4,645,961 A | 2/1987 | Malsky | |
| 4,663,835 A * | 5/1987 | Caillier, Sr. | 29/598 |
| 4,667,123 A | 5/1987 | Denk et al. | |
| 4,692,631 A | 9/1987 | Dahl | |

(Continued)

*Primary Examiner*—Minh Trinh
(74) *Attorney, Agent, or Firm*—Price, Heneveld, Cooper, DeWitt & Litton LLP

(57) ABSTRACT

A method of making a wound field for a brushless direct current motor, direct current generator, alternating current motor or alternating current generator, includes providing a base mold having an engagement face with at least one movable end turn form. A number of distinct phases is determined and at least one strand of conductive material is wound around at least one movable end turn forming tool per distinct phase. One conductive coil is created from each strand of conductive material for each distinct phase. Each conductive coil is formed into a configuration that indicates the number of poles required. Each conductive coil is then placed onto an insertion instrument. The insertion instrument and each conductive coil are inserted into a stator core. The insertion instrument is removed from the stator core, and the stator core is installed into one of the aforementioned motors or generators.

13 Claims, 4 Drawing Sheets

U.S. PATENT DOCUMENTS

| | | |
|---|---|---|
| 4,714,851 A | 12/1987 | Bertram et al. |
| 4,733,118 A | 3/1988 | Mihalko |
| 4,734,603 A | 3/1988 | von der Heide et al. |
| 4,833,769 A * | 5/1989 | Tomite et al. ................. 29/597 |
| 4,937,485 A | 6/1990 | Mihalko |
| 5,197,180 A | 3/1993 | Mihalko |
| 5,460,503 A * | 10/1995 | Kitajima et al. ............. 425/116 |
| 7,275,299 B2 * | 10/2007 | Kuroyanagi et al. .......... 29/596 |
| 7,340,822 B2 * | 3/2008 | Yamamura et al. ............ 29/598 |

* cited by examiner

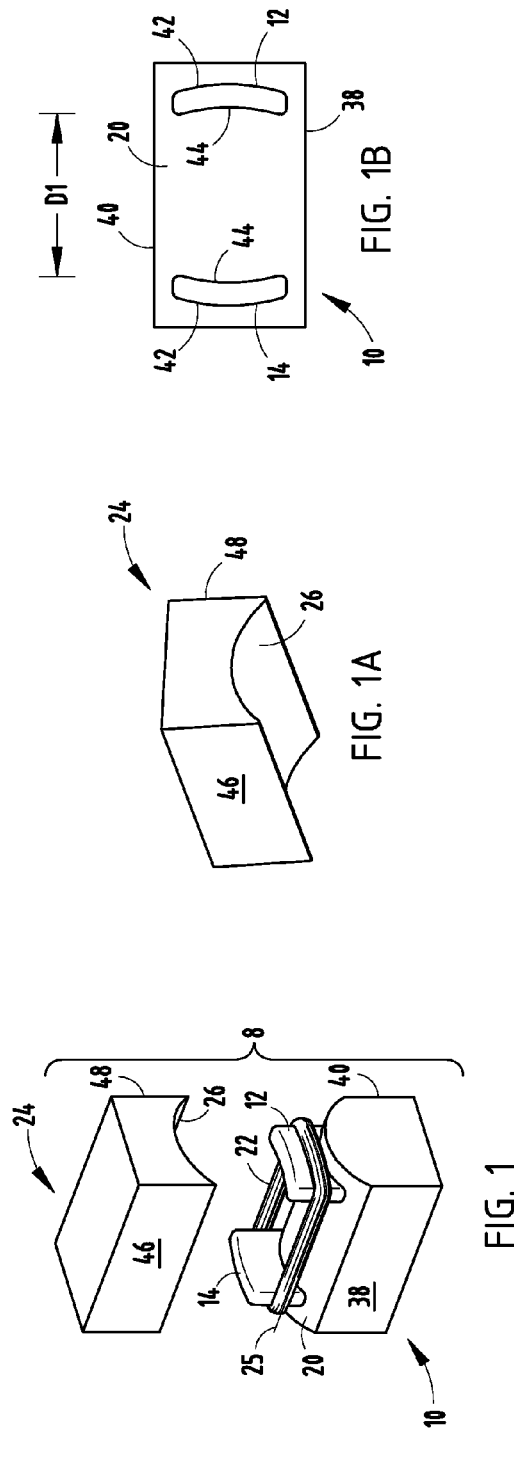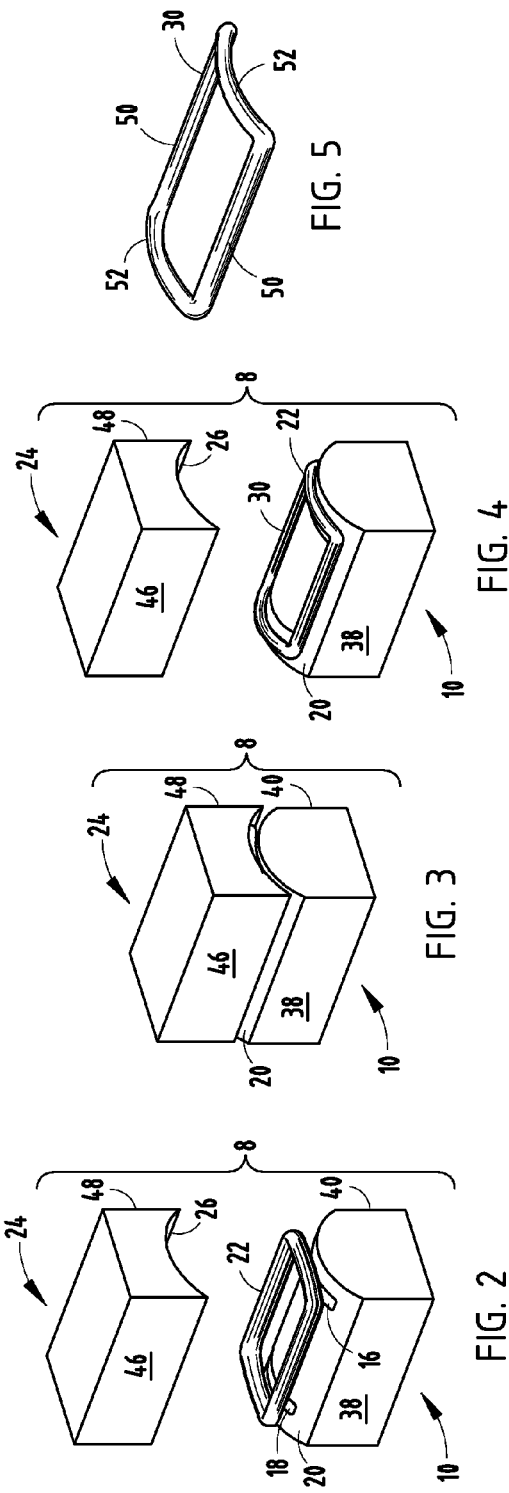

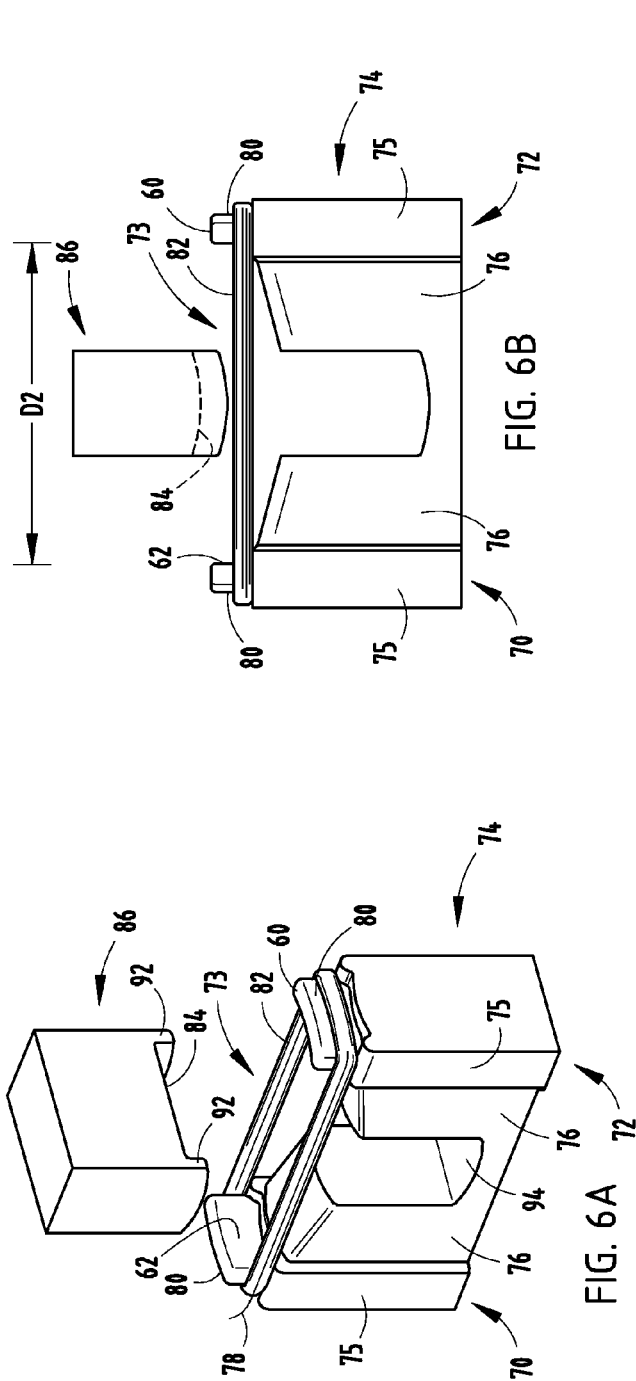
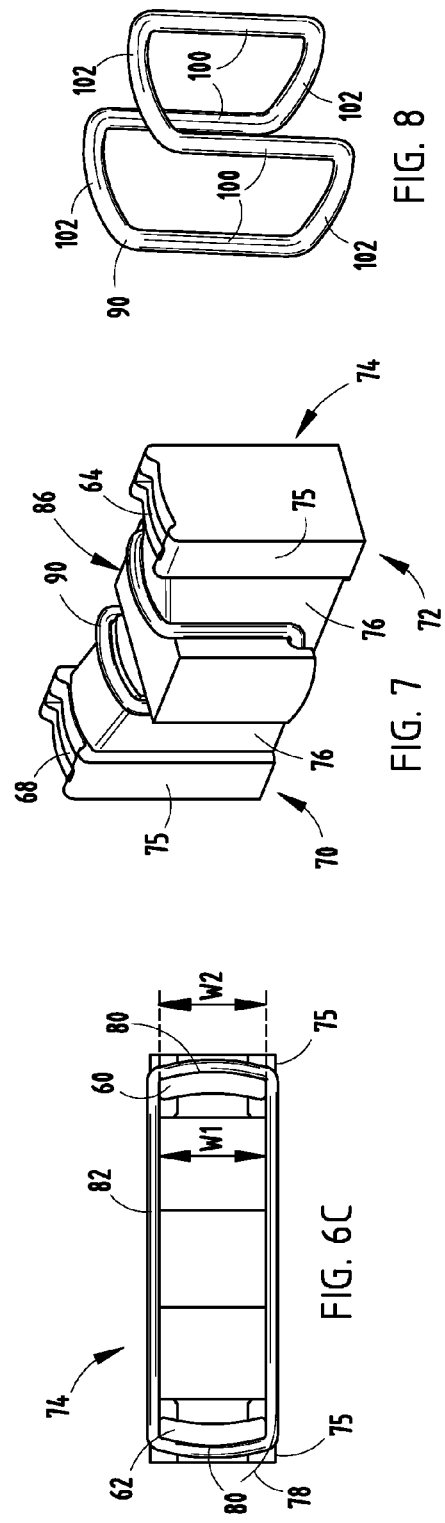

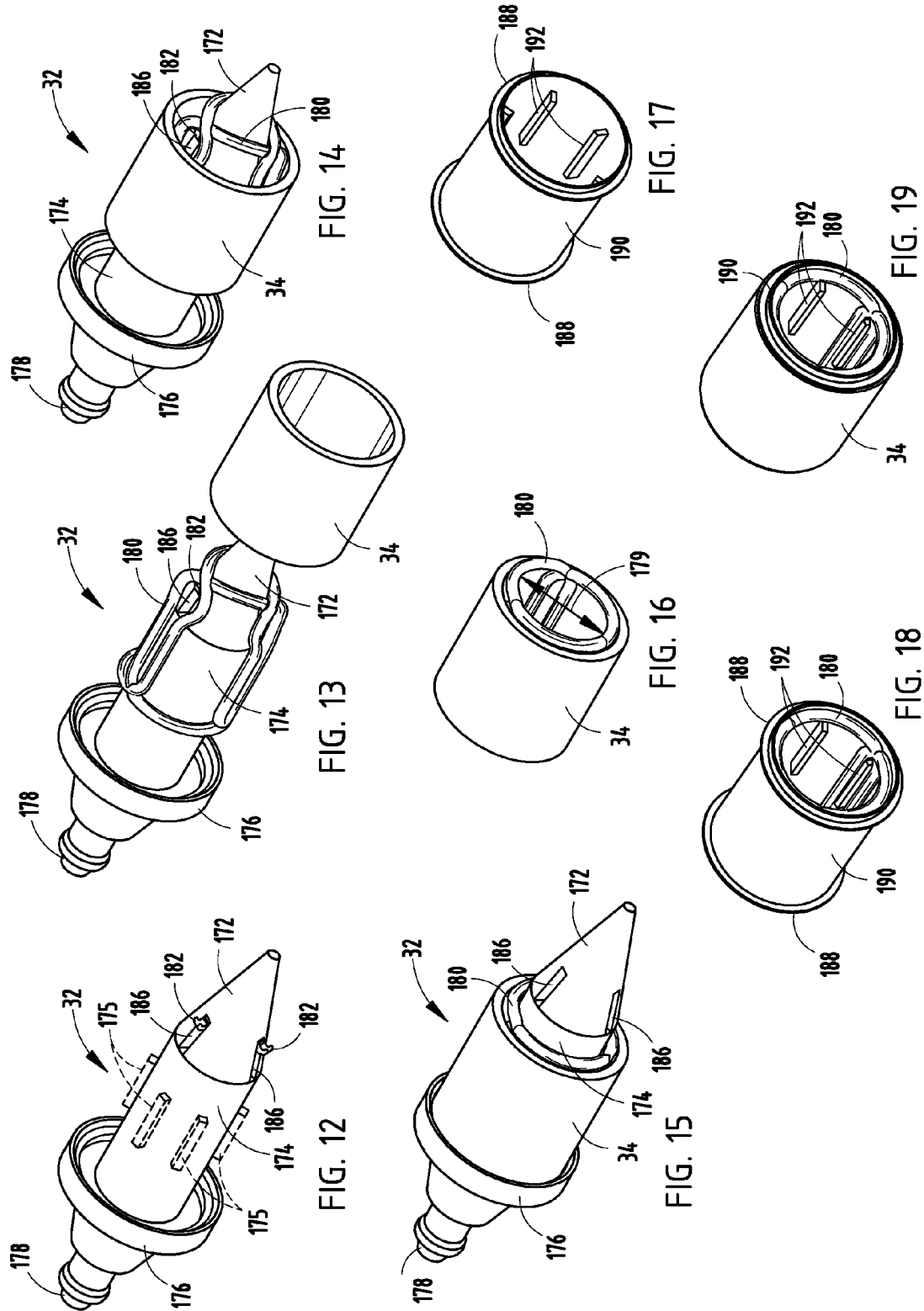

METHOD FOR WINDING BRUSHLESS DC MOTORS

BACKGROUND OF THE PRESENT INVENTION

The present invention relates to a method for making a winding for a motor or generator, and more specifically, a method for making a winding for an AC or DC brushless motor or generator.

Slotless brushless DC motors are known for having performance advantages as compared to traditional motors and are used in many capacities from medical equipment to pumps. Conventional methods are to wind a separate coil or group of coils for each magnetic pole required. The lack of defined slots and teeth, however, make the winding process more difficult and expensive than typical brushless DC motors that include teeth and slots.

Accordingly, a simplified winding method that requires only one coil per phase no matter how many poles are present in the motor is desired.

SUMMARY OF THE INVENTION

In one aspect of the present invention, a method of making a wound field for a brushless direct current motor, direct current generator, alternating current motor or alternating current generator, includes providing a base mold having an engagement face and at least one movable end turn form on the engagement face. A number of distinct phases is determined and at least one strand of conductive material is wound around at least one movable end turn forming tool per distinct phase. One conductive coil is created from each strand of conductive material for each distinct phase. Each conductive coil is formed into a configuration that indicates the number of poles required. Each conductive coil is then placed onto an insertion instrument. Each of the aforementioned steps is repeated as necessary to create a conductive coil for each distinct phase. The insertion instrument and each conductive coil are inserted into a stator core. The insertion instrument is removed from the stator core, and the stator core is installed into one of a brushless direct current motor, direct current generator, alternating current motor or alternating current generator.

In another aspect of the present invention, a method of making a wound field for a brushless direct current motor, direct current generator, alternating current motor or alternating current generator, includes providing a base mold having an engagement face and at least one movable end turn form on the engagement face. A conductive material is wound about the at least one movable end turn form to create one loop of conductive material. The at least one movable end turn form is removed from the base mold. The one loop of conductive material is formed between the application face of the press mold and the engagement face of the base mold to provide a formed coil of conductive material. The formed coil is removed from the engagement face of the base mold and the formed coil is slid over an insertion instrument. The insertion instrument and the formed coil are forced into a cylindrically-shaped stator core. The insertion instrument is removed from the stator core, and the stator core is installed into one of a brushless direct current motor, direct current generator, alternating current motor or alternating current generator.

In another aspect of the present invention, a method of making a wound field for a brushless direct current motor, direct current generator, alternating current motor or alternating current generator, includes providing a base mold and a press mold and determining a number of phases. At least one strand of conductive material is formed for each phase between the base mold and the press mold into a conductive coil that has a configuration that indicates the number of poles required. Each conductive coil is inserted into the stator core, and the stator core is installed into one of a brushless direct current motor, direct current generator, alternating current motor or alternating current generator.

These and other features, advantages and objects of the present invention will be further understood and appreciated by those skilled in the art upon studying the following specification, claims, and appended drawings.

BRIEF DESCRIPTION OF THE DRAWINGS

FIG. 1 is a front perspective view of a base mold and a press mold used for making a two-pole coil configuration;

FIG. 1A is a bottom perspective view of the press mold of FIG. 1;

FIG. 1B is a top elevational view of the base mold of FIG. 1;

FIG. 2 is a front perspective view of the base mold and press mold of FIG. 1, with the end turn forms removed;

FIG. 3 is a front perspective view of the base mold and press mold of FIG. 1 during formation of a conductive coil;

FIG. 4 is a front perspective view of the press mold and base mold of FIG. 1, after the conductive coil has been formed;

FIG. 5 is a front perspective view of a coil configuration for a two-pole motor or generator;

FIG. 6A is a front perspective view of another embodiment of a base mold and a press mold for a four-pole coil configuration following winding of a conductive material;

FIG. 6B is a side elevational view of the base mold and press mold of FIG. 6A;

FIG. 6C is a top elevational view of the base mold and press mold of FIG. 6A;

FIG. 7 is a front perspective view of the base mold and press mold of FIG. 6 during formation of a conductive coil;

FIG. 8 is a front perspective view of a conductive coil configuration for a four-pole motor or generator;

FIG. 12 is a front perspective view of one embodiment of an insertion instrument of the present invention;

FIG. 13 is a front perspective view of the insertion instrument of FIG. 12 engaged with conductive coils prior to insertion into a stator core;

FIG. 14 is a front perspective view of the insertion instrument of FIG. 12 engaged with a conductive coil during insertion of the conductive coil into the stator core;

FIG. 15 is a front perspective view of the insertion instrument of FIG. 12 engaged with a conductive coil after complete insertion of the conductive coil into the stator core;

FIG. 16 is a front perspective view of the conductive coil fully inserted into the stator core;

FIG. 17 is a front perspective view of a molded insulator for a stator core;

FIG. 18 is a front perspective view of a conductive coil inserted into a molded insulator; and FIG. 19 is a front perspective view of a conductive coil and molded insulator inserted into a stator core.

DETAILED DESCRIPTION OF PREFERRED EMBODIMENTS

Figure 10:
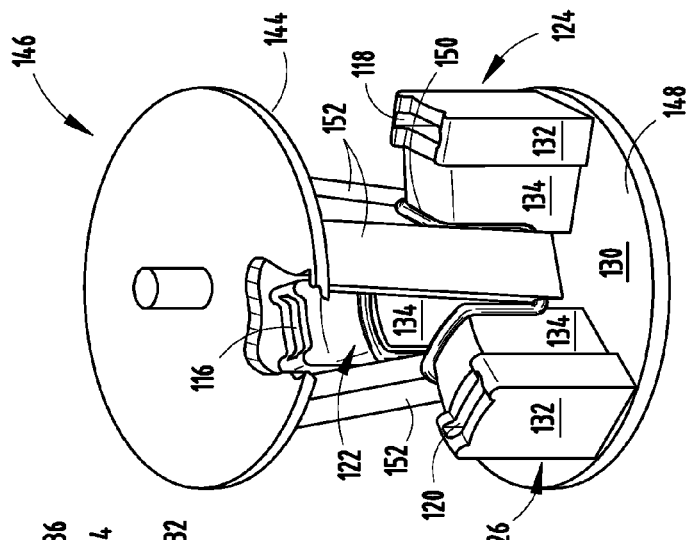
FIG. 10 is a front perspective view of the base mold and press mold of FIG. 9 during formation of a conductive coil, with a portion of the press mold broken away.
Figure 9A:
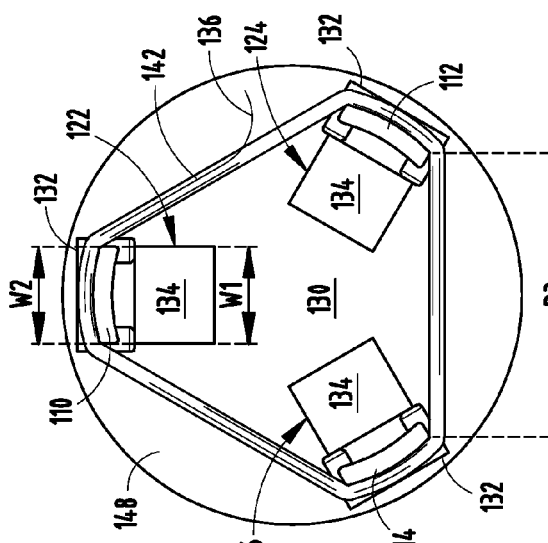
FIG. 9A is a top elevational view of the base mold of FIG. 9.

For purposes of description herein the terms "upper", "lower", "right", "left", "rear", "front", "vertical", "horizontal" and derivatives thereof shall relate to the invention as oriented in FIGS. 1-5. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, the reference numeral 8 generally designates a molding system having a base mold 10 with first and second end turn forms 12, 14. The first and second end turn forms 12, 14 are adapted to be inserted into first and second slots 16, 18 (FIG. 2) that open upwardly on an engagement face 20 of the base mold 10. The end turn forms 12, 14 are used to make a wound coil 22 for a brushless direct current motor, direct current generator, alternating current motor or alternating current generator. The wound coil 22 is made from a conductive material 25 wound about the first and second end turn forms 12, 14 to create one loop of conductive material. After winding is complete, the end turn forms 12, 14 may be removed from the base mold 10. A press mold 24 is provided having an application face 26 that is complementary in shape to the engagement face 20 of the base mold 10. The press mold 24 may have downwardly extending slots adapted to receive the end turn forms 12 and 14. The one loop of conductive material 25 is formed between the application face 26 of the press mold 24 and the engagement face 20 of the base mold 10 to provide a formed coil 30 of conductive material. The formed coil 30 is removed from the engagement face 20 of the base mold 10. The formed coil 30 is slid over an insertion instrument 32 (FIG. 12). The insertion instrument 32 and the formed coil 30 are forced into a cylindrically-shaped stator core 34 (FIG. 19). Optionally, the formed coil 30 may be bonded by a varnish or adhesive. The insertion instrument 32 is removed from the stator core 34, and the stator core 34 is installed into one of a brushless direct current motor, direct current generator, alternating current motor or alternating current generator.

Referring again to FIGS. 1-4, the engagement face 20 of the base mold 10 is generally convex, with the center of the base mold having a height greater than first and second sides 38, 40 of the base mold 10. However, it is contemplated that other engagement face arrangements are possible. As shown in FIG. 1B, the first and second end turn forms 12, 14 have a generally concave side 42 and a generally convex side 44 wherein the concave sides 42 of both the first and second end turn forms 12, 14 face inwardly toward the center of the base mold 10. The application face 26 of the press mold 24 has a concave construction such that the center of the press mold has a depth less than the first and second sides 46, 48 of the press mold 24. However, it is contemplated that other application face arrangements are possible.

To prepare a two-pole coil for installation into the stator core for use in a brushless direct current motor, direct current generator, alternating current motor or alternating current generator, the first and second end turn forms 12, 14 are inserted into the first and second slots 16, 18, respectively, of the base mold 10. At least one strand of conductive material 25 is then wound about the ends and the convex side 42 of the first and second end turn forms 12, 14. The distance D1 between the end turn forms 12, 14 is equal to the height, or stack length, of the conductive coil 22 after the conductive coil 22 has been formed and installed into the stator core 34 plus room for clearance. The clearance refers to minimal spacing associated with the thickness of the conductive coil 22. After a predetermined number of revolutions has been made around the end turn forms 12, 14 and a conductive coil 22 has been made, the conductive material is cut. The end turn forms 12, 14 may be removed from the first and second slots 16, 18. Alternatively, the end turn forms 12, 14 may retract into first and second slots 16, 18. The end turn forms 12, 14 may be spring biased to an extended position and pressed into the first and second slots 16, 18 by the application face 26 of the press mold 24. The application face 26 of the press mold 24 is designed to descend upon and engage the engagement face 20 of the base mold 10 to shape the three dimensional formed conductive coil 30. The press mold 24 is lifted and the formed conductive coil 30 is removed from the base mold 10. Optionally, the formed coil 30 may be bonded by a varnish or adhesive. The formed conductive coil 30 for a two-pole motor or generator has two stack portions 50 and two end turn portions 52.

Referring now to FIGS. 6A, 6B, 6C, 7, and 8, to prepare a four-pole coil for installation into a stator core used in a brushless direct current motor, direct current generator, alternating current motor or alternating current generator, first and second end turn forms 60, 62 are inserted into first and second slots 64, 68, (FIG. 7) respectively, of first and second upwardly extending columns 70, 72, respectively, on an engagement face 73 of a base mold 74. Each upstanding column 70, 72 has a rectangular winding contour 75 adjacent to a slanted forming contour 76. The first and second slots 64, 68 are disposed in the rectangular winding contour 75 of the first and second upwardly extending columns 70, 72, respectively. At least one strand of conductive material 78 is then wound around the ends and a convex side 80 of each of the first and second end turn forms 60, 62. After a predetermined number of revolutions has been made around the end turn forms 60, 62 and a conductive coil 82 having a rectangle-like shape has been made, the conductive material 78 is cut. The distance D2 between the end turn forms 60, 62 is approximately equal to two times the stack length plus the pole pitch plus clearance. The end turn forms 60, 62 are then removed from the first and second slots 64, 68 in the rectangular winding contours 75 of the first and second upwardly extending columns 70, 72. Alternatively, the end turn forms 60, 62 may retract into the first and second slots 64, 68. The end turn forms 12, 14 may be spring biased to an extended position and pressed into the first and second slots 64, 68 by the application face 84 of the press mold 86. An application face 84 of a press mold 86 engages the engagement face 73 of the base mold 74 to make a three dimensional formed conductive coil 90. More specifically, two ridges 92 on the application face 84 contact the conductive coil 82 on two sides of the coil, thereby forcing the middle portion of the conductive coil 82 downwardly toward a bottom of the base mold 74. As the conductive coil 82 is formed, the ends of the conductive coil 82 slide off the rectangular winding contour 75 of the first and second upwardly extending columns 70, 72 and onto the slanted forming contours 76. The width W1, shown in FIG. 6C, of the slanted forming contours 76 is approximately equal to the width W2 of the end turn forms 60, 62 which is equal to the pole pitch present in the motor or generator being constructed. The height from the lowest side of the slanted forming contour to a bottom 94 of the base form is equal to the stack length of the formed conductive coil 90. When the application face 84 contacts a bottom of the base form 74, the formed conductive coil 90 is complete. The press mold 86 is lifted and the formed conductive coil 90 is removed from the base mold 74. Optionally, the formed conductive coil 90 may be bonded by a varnish or adhesive.

The conductive coil, shown in FIG. 8, for a four-pole motor or generator includes four stack portions 100 and four end turn portions 102. As will be described in greater detail below, for each number of poles required for a particular motor or generator, the number of stack portions and end turn portions will be equal to the number of poles present.

Figure 11:
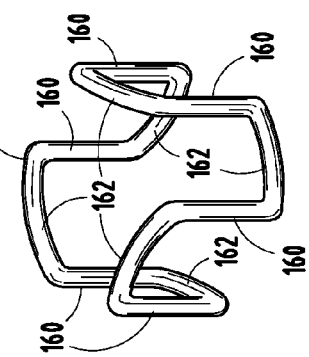
FIG. 11 is a front perspective view of a coil configuration for a six-pole motor or generator.
Figure 9:
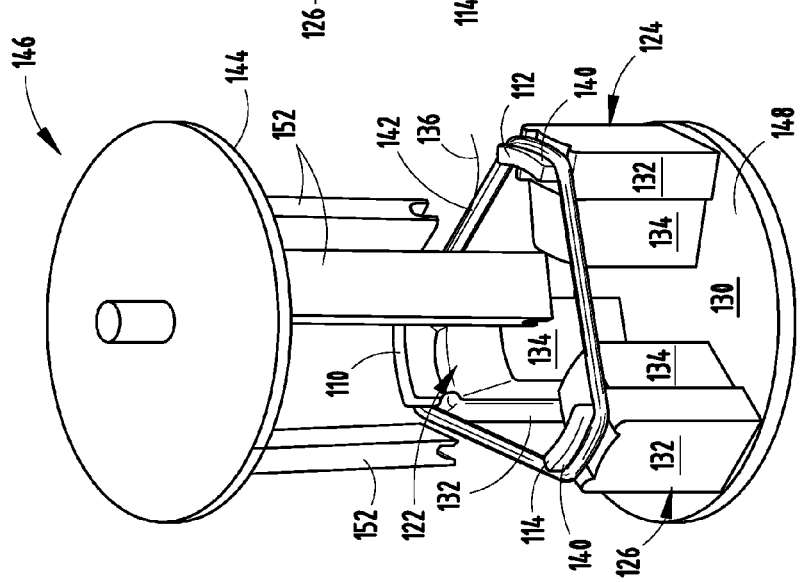
FIG. 9 is a front perspective view of another embodiment of a base mold and a press mold for a six-pole coil configuration following winding of a conductive material.

As shown in FIGS. 9-11, to prepare a six pole coil for installation into the stator for use in a brushless direct current motor, direct current generator, alternating current motor or alternating current generator, first, second, and third end turn forms 110, 112, 114 are inserted into first, second, and third slots 116, 118, 120, respectively, present in first, second and third upwardly extending columns 122, 124, 126, respectively, of a base mold 130. Each upstanding column 122, 124, 126 has a rectangular winding contour 132 adjacent to a slanted forming contour 134. The first, second, and third slots 116, 118, 120 are disposed in the rectangular winding contour 132 of the first, second and third upwardly extending columns 122, 124, 126, respectively. At least one strand of conductive material 136 is then wound about the first, second, and third end turn forms 110, 112, 114 so that the conductive material 136 wraps around a convex side 140 of each end turn form 110, 112, 114. The distance D3 between the end turn forms 110, 112, 114 is approximately equal to two times the stack length plus the pole pitch plus clearance. After a predetermined number of revolutions have been made around the end turn forms 110, 112, 114 and a conductive coil 142 having a triangle-like shape has been made, the conductive material 136 is cut. The end turn forms 110, 112, 114 are then removed from the first, second, and third slots 116, 118, 120, respectively, in the winding contour 132 of the first, second and third upwardly extending columns 122, 124, 126, respectively. Alternatively, the end turn forms 110, 112, 114 may retract into the first, second and third slots 116, 118, 120. The end turn forms 110, 112, 114 may be spring biased to an extended position and pressed into the first, second, and third slots 116, 118, 120 by the application face 144 of the press mold 146. An application face 144 of a press mold 146 then engages an engagement face 148 of the base mold 130 to form a three dimensional formed conductive coil configuration 150 (FIG. 11). More specifically, the application face 144 includes three ridges 152 adapted to contact the conductive material 136 on each of three sides of the conductive material 136, and force the conductive material 136 downwardly toward the base of the upwardly extending columns 122, 124, 126. As the formed conductive coil 150 is made, the ends of the formed conductive coil 150 slide off the rectangular winding contour 132 and onto the slanted forming contours 134. The width W1 of the slanted forming contour 134 is approximately equal to the width W2 of the end turn forms 110, 112, 114 which is equal to the pole pitch that will be present in the motor or generator being constructed. The height from the lowest side of the slanted forming contours 134 to the engagement face 148 of the base form 130 may be equal to or more than the stack length. Optionally, the formed conductive coil 136 may be bonded by a varnish or adhesive. When the ridges 152 contact the engagement face 148 of the base form 130, the conductive coil 136 is fully formed. The press mold 146 is lifted and the formed conductive coil 150 is removed from the base mold 130.

The formed conductive coil 150 for a six-pole motor or generator, as shown in FIG. 11, includes six stack portions 160 and six end turn portions 162. The embodiments disclosed above are for illustration and it is contemplated that eight, ten, twelve, etc. pole motors or generators can be constructed in a similar manner as described above with respect to the two, four and six pole coil wind and form operations. For an eight, ten, twelve, etc. pole motor or generator, the conductive coil will have the same number of stack portions and end turn portions as the number of poles in the motor or generator. More coils may be appropriate if more phases are used in the motor or generator.

Referring now to FIGS. 12-16, the insertion instrument 32 includes a conical front piece 172, an elongate body 174, a stop plate 176, and a plunger 178. Optionally, protrusions 175 may extend along the elongate body and provide some separation between multiple conductive coils arranged on the insertion instrument 32. The blades may be angled or extend parallel with the longitudinal extent of the insertion instrument, as shown in FIG. 12. The tapered construction of the conical front piece 172 allows the insertion instrument 32 to be inserted between one or more conductive coils 180, as shown in FIG. 13. The outside diameter of the insertion instrument 32 is designed to form and then size an inside diameter 179 (FIG. 16) of the coils 180 to fit within an inside diameter of the stator core 34. More specifically, the insertion instrument 32 has an outside diameter that is sized to shape an inside diameter 179 of a/many coil(s) 180 during insertion of the coil(s) 180 into the stator core 34, regardless of the number of stack portions and end turn portions on the coil(s) 180. The coils 180 are shown in FIG. 13 having a shape similar to those in FIG. 5, but include rounded corners. In addition, The insertion instrument may be used to hold the conductive coils 180 while the coils 180 are being varnished or bonded. The insertion instrument 32 may include at least one hook 182 and may include several hooks 182 designed to contact and hold a portion of the conductive coil 180 prior to the conductive coil 180 being fully inserted into the stator core 34. The hooks 182 are connected inside the elongate body 174 to the plunger 178. Alternatively, there may be hooks 182 on the elongate body 174 near the stop plate 176. When the plunger 178 is depressed, the hooks 182 retract into recesses 186 in the conical front piece 172. In an alternative embodiment, the hooks 182 retract into the elongate body 174. When the insertion instrument 32 has been inserted into the stator core 34 a predetermined distance, as shown in FIG. 14, the plunger 178 is depressed and the hooks 182 are retracted to allow the conductive coil 180 to slide back along the elongate body 174 of the insertion instrument 32 as shown in FIG. 15. Once the conductive coil 180 has been properly positioned inside the stator core 34, the insertion instrument 32 is withdrawn from contact with the conductive coil 182, leaving the conductive coil 182 in contact with an inside diameter of the stator core 34 (FIG. 16).

As shown in FIGS. 17-19, an insulator may be present inside the stator core 34. A variety of different insulators may be used, including a sheet film insulator, powder insulator, molded insulator or any other insulator that is relatively non-conductive. If a sheet film insulator is used, the sheet film insulator is wrapped about the inside diameter of the stator core 34. If a powder insulator is used, the stator core 34 may be electrically charged by a charging tool, and the powder is sprayed onto the stator core 34. The powder is then wiped off of the outside diameter of the stator core 34 and allowed to remain on the inside of the stator core. The powder is then heated and cured to ensure that the powder provides a nonconductive solid coating that stays on the stator core 34. Alternatively, the stator core 34 could be dipped in a fluidized bed of powder and cured. If a molded insulator 190, as shown in FIG. 17, is used, the molded insulator 190 is typically shaped to be closely received in the stator core 34 and includes circumferential flanges 188 adapted to hold the molded insulator 190 in place inside the stator core 34. The molded insulator 190 may include protrusions 192 that help hold the conductive coil 180 in place inside the molded insulator 190. The molded insulator 190 is then inserted into the stator core 34. After the molded insulator 190 is inserted into the stator core 34, the conductive coil 180 is forced into the molded insulator 190 by the insertion instrument 32, as described above. Alternatively, the conductive coil 180 may be inserted into the molded insulator 190 first by the insertion instrument 32. Then the molded insulator 190 and conductive coil 180 together are inserted into the stator core 34 by the insertion instrument. The stator core 34 is then ready to be inserted into a motor or generator.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A method of making a wound field for a brushless direct current motor, direct current generator, alternating current motor or alternating current generator, said method comprising the steps of:
   providing a base mold having an engagement face and at least one movable end turn form on the engagement face;
   winding a conductive material about the at least one movable end turn form to create one loop of conductive material;
   removing the at least one movable end turn form from the base mold;
   providing a press mold having an application face;
   forming the one loop of conductive material between the application face of the press mold and the engagement face of the base mold to provide a formed coil of conductive material;
   removing the formed coil from the engagement face of the base mold;
   sliding the formed coil over an insertion instrument;
   forcing the insertion instrument and the formed coil into a cylindrically-shaped stator core;
   removing the insertion instrument from the stator core; and
   installing the stator core into one of a brushless direct current motor, direct current generator, alternating current motor or alternating current generator.

2. The method of claim 1, further comprising the step of:
   installing a rotor having at least two poles inside the stator core.

3. The method of claim 1, wherein the step of forming the one loop of conductive material between the application face of the press mold and the engagement face of the base mold further includes forming at least a portion of the one loop of conductive material into an arcuate shape adapted to slide over and closely receive the outside diameter of the insertion tool.

4. The method of claim 1, wherein the stator core includes a number of poles, the number of poles being an even number which is determined based on the shape of the formed coil.

5. The method of claim 1, wherein the insertion instrument has a tapered front end with a hook or blades disposed on the tapered front end.

6. The method of claim 5, further comprising the step of:
   engaging the formed coil against the hook disposed on the tapered front end of the insertion instrument.

7. The method of claim 6, further comprising the step of:
   depressing a plunger disposed on a rear portion of the insertion instrument and that is connected to the hook such that the hook retracts into a hook recess disposed on the tapered front end of the insertion instrument.

8. The method of claim 7, wherein the step of forcing the insertion instrument and the formed coil further comprises the steps of:
   forcing the insertion tool into the stator core until a stop plate on the insertion instrument abuts the stator core; and
   forming an inside diameter of the formed coil.

9. The method of claim 1, wherein the stator core includes a sheet film insulator disposed about the inside diameter of the stator core.

10. The method of claim 1, wherein the stator core includes a heated and cured powder insulator disposed about an inside diameter of the stator core.

11. The method of claim 1, wherein the stator core includes a molded insulator disposed about an inside diameter of the stator core.

12. The method of claim 11, wherein the molded insulator is inserted into the stator core in abutting contact with the inside diameter of the stator core, and the insertion tool inserts the formed coil into an inside diameter of the molded insulator.

13. The method of claim 11, wherein the formed coil is inserted into the molded insulator and over the insertion instrument and wherein the insertion instrument is then used to insert both the one continuous formed loop of conductive material and the molded insulator into the stator core.

\* \* \* \* \*